United States Patent [19]

Korpi

[11] Patent Number: 4,864,291
[45] Date of Patent: Sep. 5, 1989

[54] SCSI CONVERTER

[75] Inventor: James E. Korpi, Santa Clara, Calif.

[73] Assignee: Tandem Computers Incorporated, Cupertino, Calif.

[21] Appl. No.: 209,672

[22] Filed: Jun. 21, 1988

[51] Int. Cl.[4] .......................... H04Q 5/00; H04Q 1/18; H04J 3/02
[52] U.S. Cl. .............................. 340/825.500; 370/85.1; 364/200; 364/900
[58] Field of Search ... 364/200 MS File, 900 MS File; 307/260, 261, 262, 276, 151; 370/124, 85, 17, 93; 340/825.5, 825.05, 825.51

[56] References Cited

U.S. PATENT DOCUMENTS

| 4,375,639 | 3/1983 | Johnson, Jr. | 340/825.5 |
| 4,716,525 | 12/1987 | Gildnyi et al. | 364/200 |
| 4,739,323 | 4/1988 | Miesterfeld et al. | 340/825.5 |
| 4,755,990 | 7/1988 | Bohler et al. | 340/825.5 |
| 4,779,089 | 10/1988 | Thesis | 340/825.5 |

Primary Examiner—Donald J. Yusko
Assistant Examiner—E. D. Pudpud
Attorney, Agent, or Firm—Townsend & Townsend

[57] ABSTRACT

A converter for coupling a single-ended and a differential SCSI bus that facilitates the use of the ARB, SELECTION, and RESELECTION phases of the SCSI protocol.

5 Claims, 5 Drawing Sheets

SCSI CONVERTER

BACKGROUND OF THE INVENTION

1. Field of the Invention

The present invention relates generally to digital bus structures and more particularly relates to a converter for converting between single-ended and differential bus signals.

2. Description of the Relevant Art

The Small Computer System Interface (SCSI) bus protocol is fully described in the American National Standard ANSI X3.131-1986 available from American National Standards Institute, Inc., 1430 Broadway, New York, NY 10018. Generally, up to eight devices, including small computers and peripherals, may be coupled to the bus. The bus includes data and control lines with the bus protocol facilitating information transfer between the devices on the bus. A particularly useful feature of this bus is that a separate bus controller is not utilized. The bus protocol is implemented by the devices coupled to the bus.

A short overview of some aspects of the protocol follows. A complete description is provided in the above-referenced standard, while more detailed examples of particular aspects of the protocol are provided below.

Information transfers are initiated by a computer, with the actual computer initiating a given transfer denoted the initiator. The initiator selects a target which controls the actual information transfer. In certain situations an information transfer may be interrupted and at a later time the target will reselect the initiator to continue the transfer.

The physical bus includes a set of conductive lines for carrying electrical bus signals and terminators at both ends of the bus. Devices coupled to the bus cannot be remote from the bus unless a special converter is coupled to the bus at one side and a cable to the remote device at the other side. The converter functions to satisfy the electrical requirements of the bus standard and includes receiver/driver pairs to interface the required signals to the remote device.

A particularly useful type of converter converts between single ended signals transmitted on an internal bus and differential signals transmitted on an external bus. These differential signals are less sensitive to noise and are required by some data storage devices. Ideally, the converter would be transparent to devices coupled to either bus and the combination of both buses would function as a single bus.

However, the SCSI protocol creates situations where the receiver/driver pairs converting between single-ended and differential signals become latched and cannot be released by the device asserting the signal. Accordingly, converters may be utilized only for configurations that do not utilize the full capability of the SCSI protocol. Thus, a converter providing for a more complete use of this capability is greatly needed because of the wide acceptance of the standard and the great number of devices being manufactured to interface with the SCSI bus.

SUMMARY OF THE INVENTION

The present invention is a device for converting between single-ended signals transmitted on an internal SCSI bus and differential signals transmitted on an external SCSI bus that facilitates the use of the ARBITRATION (ARB), SELECTION (SEL), and RESELECTION (RES) phases of the SCSI protocol.

According to one aspect of the invention, the BSY lines of the internal and external buses are coupled to a unique transceiver configuration that prevents latch-up during the ARB and SEL phases of the protocol. A BSY signal is transmitted from the internal side to the external side only when a PASS.INT.BSY (PIB) signal is set and from the external to the internal side only when a PASS.EXT.BSY (PEB) signal is set. The PIB signal is set when the bus is in the BUS.FREE or ARBITRATION phase and the PEB signal is set when the bus is in the BUS.FREE or ARBITRATION phase and a device on the external side asserts its device ID. Thus, a device on either side of the converter may transmit its BSY signal to the other side during the ARB phase.

According to a further aspect of the invention, the PIB and PEB signals are reset when a device on either side asserts SEL to terminate the ARB phase. Thus, any possible latch-up is terminated and the BSY line is released.

During the RESELECTION phase, a target device desiring to resume a previous data transfer has won ARBITRATION and asserted it SEL signal. During RESELECTION, the target releases BSY, and, after a delay, the reselected initiator asserts BSY in response. The target then reasserts BSY, and, after a delay, releases SEL. The initiator then releases BSY.

Thus, it is possible that latch-up can occur when both the target and the initiator are asserting BSY. In the present invention, when the target is on the external side, the BSY signal is transferred only form the external to the internal side subsequent to the release of SEL to prevent latch-up.

Other features and advantages of the invention will become apparent in view of the appended drawings and following detailed description.

DETAILED DESCRIPTION OF THE PREFERRED EMBODIMENTS

The present invention is a converter for transferring signals between an internal single ended SCSI bus and an external differential SCSI bus. Referring now to the drawings, where like reference numerals denote identical or corresponding parts throughout the several views, FIG. 1 is a block diagram illustrating the connection of the converter to the buses.

Figure 1:
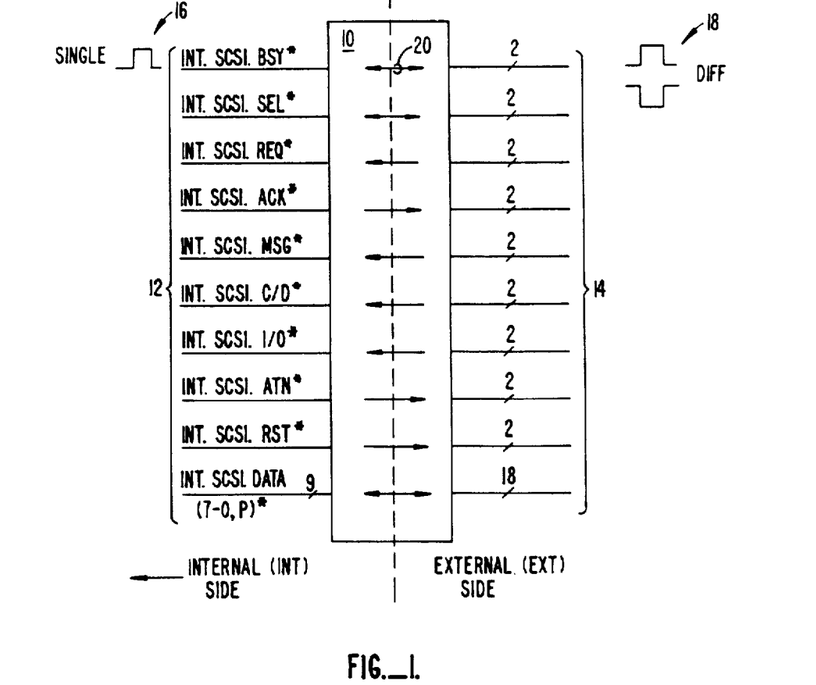
FIG. 1 is a block diagram of a converter coupling a single-ended and a differential SCSI bus.

In FIG. 1, a converter 10 has an internal side coupled to an internal, single-ended SCSI bus 12 and an external side coupled to an external, differential SCSI bus 14. A single-ended signal 16 is asserted on one busline while its corresponding differential signal 18 is asserted on a pair of bus lines with a signal corresponding to the single-ended signal asserted on one line and to its complement asserted on the other. Thus, the external bus 14 has twice as many buslines as the internal bus 12.

The arrows 20 depicted within the converter 10 indicate which directions a signal asserted on a particular busline may be transmitted. For example, the BUSY (BSY) signal may be transmitted in either direction while the REQUEST (REQ) signal may only be transmitted from the external side to the internal side of the converter 10. The reasons for restricting the direction of transfer for certain signals will be described below.

In the following description, signals asserted on the actual bus lines will include the label SCSI, while signals internal to the converter 10 will not include that label. Additionally, signals will be labelled EXT and INT to signify the side of the converter 10 where they function.

Figure 2:
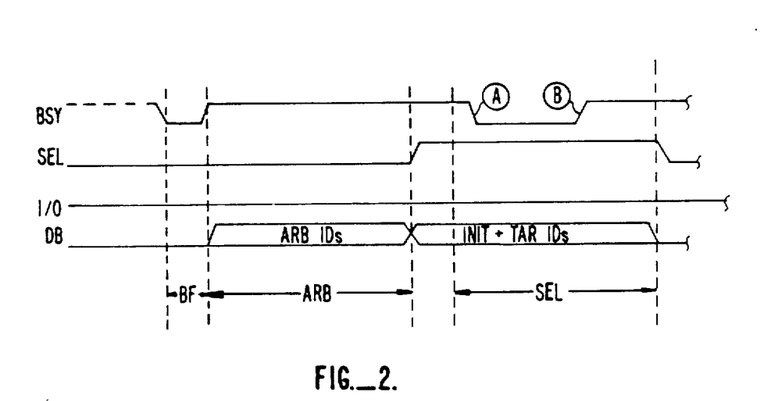
FIG. 2 is a timing diagram illustrating the SCSI ARBITRATION and SELECTION phases.

FIG. 2 is a timing diagram illustrating the operation of the SCSI bus protocol during the BUS.FREE (BF), ARBITRATION (ARB), and SELECTION phases. Each device is assigned a unique device ID data line corresponding to the device ID. The states of the BSY, SEL, I/O, and DATABUS (DB) signals are depicted in FIG. 2. (Note that the actual bus signals on the internal bus are low true.) The BUS.FREE phase is defined when signals BSY and SEL are false. During this phase any device may request control of the bus by asserting a signal on the BSY line and on its device ID line. Once a particular device asserts BSY and its device ID, there is a time window where other devices may also assert BSY and their device IDs. Accordingly, several devices may assert signals on the BSY line and their corresponding unique ID DATA lines. The BSY line is OR-tied to the various devices to facilitate several devices asserting BSY at the same time.

Referring back to FIG. 1, it is possible that a device on either side of the converter 10 will assert BSY or that devices on both sides of the converter 10 may simultaneously assert BSY. Accordingly, the converter must be able to transmit the BSY signal in both directions as indicated by the arrow 20.

If more than one device is requesting control of the bus, each device examines the data lines to see which IDs are asserted. The SCSI protocol assigns priority to the various lines with DB line 7 having the highest priority. Of the devices asserting BSY, the device with the highest priority wins the arbitration and asserts SEL to end the ARB phase. When SEL is asserted all other devices release BSY and their ID lines to begin the select (SEL) phase. The arbitration winning device asserts its ID and the ID of its selected target device and, after a delay, releases BSY (point A). After another delay, the selected target device detects that SEL and its device ID are true, that BSY is false, and then asserts BSY (point B).

Figure 3:
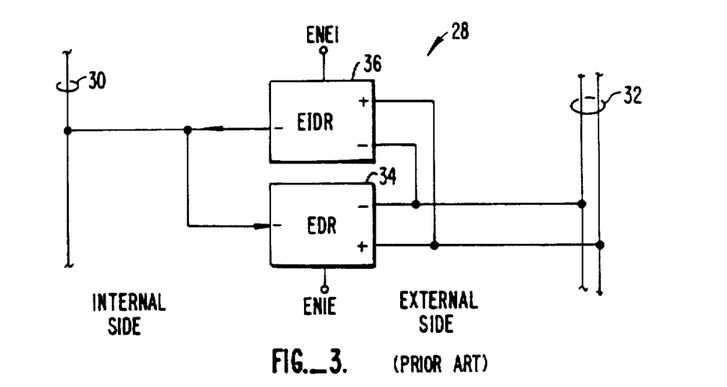
FIG. 3 is a schematic diagram of a receiver/driver pair configuration coupling lines of the internal and external buses.

FIG. 3 is a schematic diagram of a typical driver configuration utilized to couple a single-ended internal bus line 30 to a differential external bus line pair 32. An internal to external receiver/driver (IER) 34 has its input coupled to the internal bus line 30, its outputs coupled to the external bus line pair 32 and is enabled when signal ENIE is set. Similarly, an external to internal receiver/driver (EIRD) 36 has its inputs coupled to the external bus line pair 32, its output coupled to the internal bus line 30, and is enabled when signal ENEI is set.

If the bus lines 30 and 32 in FIG. 3, represent the internal and external BSY lines, then as described above, both receiver/driver pairs 34 and 36 could be enabled during the BUS.FREE state to transmit the BSY signal in either direction. However, if both pairs 34 and 36 are enabled, then a signal asserted on either side will causes the pairs to latch-up because the output of each pair is coupled to the input of the other. Thus, the latched-up pairs will continue to drive the buses regardless of whether the device originally asserting the signal later releases it.

Thus, for example, referring to FIG. 2 and the SELECTION phase, the BSY signal could not be removed by the device winning the arbitration to allow the selection of the target. Accordingly, the use of a driver configuration similar to that depicted in FIG. 3 must be limited to configurations that avoid the possibility of latch-up.

Figure 4:
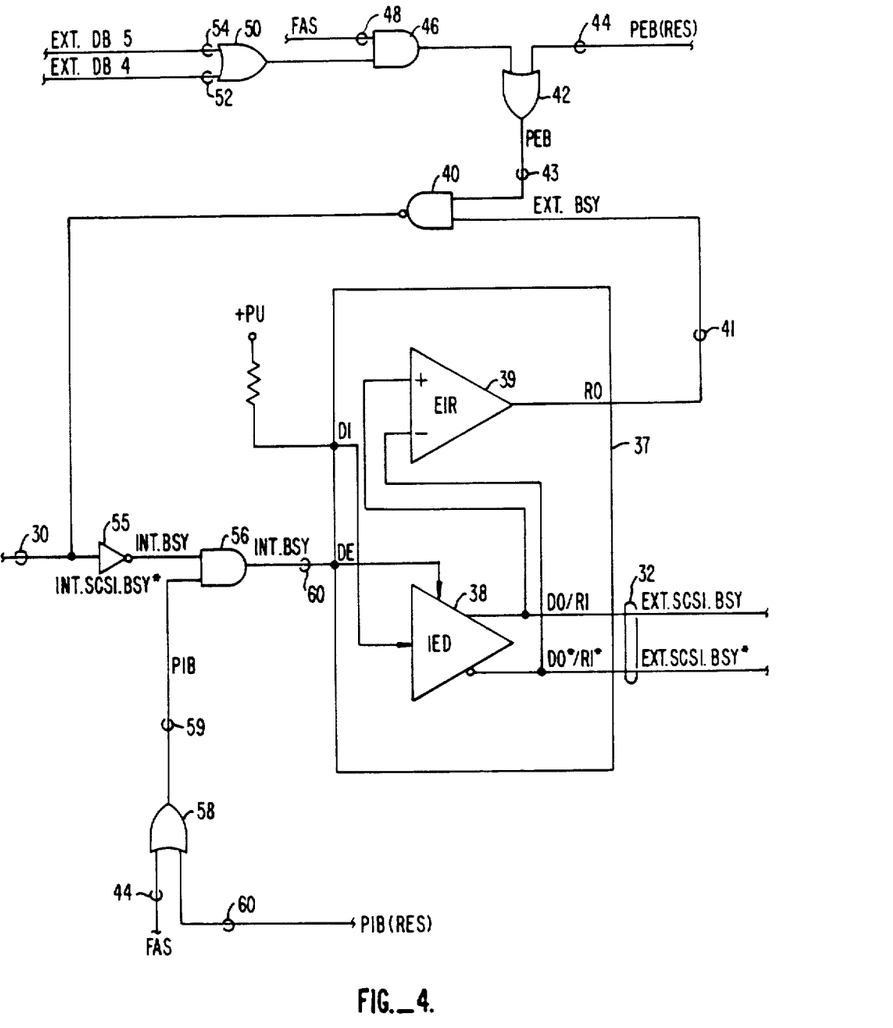
FIG. 4 is a schematic diagram of a transceiver configuration utilized in a preferred embodiment.

FIG. 4 is a schematic diagram of a transceiver 37 and associated logic utilized to transmit signals between the internal BSY line and external BSY line pair 30 and 32 in a preferred embodiment of the invention. In FIG. 4, the input of an IED 38 is tied to logic 1 through the DI port of the transceiver 37 and the enable input is coupled to the INT.BSY line 60 through the DE port of the transceiver 37. The outputs of the IED 38 and the inputs of an EIR 39 are coupled to the DO/RI ports and DO*/RI* ports of the transceiver 37. The output of the EIR 39 is coupled to the RO port.

The RO port is coupled to the INT.SCSI.BSY* line 30 via a NAND gate 40 which functions as a driver for INT.SCSI.BSY* line 30. The NAND gate 40 has a first input coupled to the RO port by an EXT.BSY signal line 41 and a second input coupled to the output of a first OR gate 42 by a PASS.EXT.BSY (PEB) signal line 43. The inputs of the first OR gate 42 are coupled to a PEB(RES) line 44 and the output of a second AND gate 46. The inputs of the second AND gate 46 are coupled to an FAS signal line 48 and to the output of a second OR gate 50. The inputs of the second OR gate 50 are coupled to EXT.DB4 and EXT.DB5 signal lines 52 and 54.

The INT.SCSI.BSY* line 30 is coupled to the DE port via an invertor 55, which functions as a receiver for the INT.SCSI.BSY* line, and an AND gate 56. The inputs of the AND gate 56 are coupled to the invertor 55 and to the output of a third OR gate 58 by a PASS-.INT.BSY (PIB) signal line 59 while its output is coupled to an INT.BSY line 60. The inputs of the third OR gate 58 are coupled to the FAS line 44 and to a PIB(RES) signal line 60.

The operation of the circuit depicted in FIG. 4 during the ARB and SELECTION phases will now be described with reference to the timing diagrams of FIGS. 2 and 5. In the present example, only devices that assert their device lines on EXT.SCSI.ID lines 4 and 5 are located on the external side of the converter 10. Additionally, the PEB(RES) and the PIB(RES) signals are not set during these phases. The IED 38 will assert the EXT.SCSI.BSY signals when the INT.BSY signal is asserted by an internal device. The INT.BSY signal is the inverted INT.SCSI.BSY* signal gated by the AND gate 56. The gating signal for the AND gate 56 is the PIB signal, which is set when the FREE.ARB.STATE (FAS) signal is set. Thus, the INT.SCSI.BSY* signal will be transmitted to the EXT.SCSI.BSY line pair 32 when the FAS signal is set.

The EIR 39 asserts an EXT.BSY signal on line 41 when the EXT.SCSI.BSY signal is asserted by an external device. The EXT.BSY signal is inverted and transmitted to the INT.SCSI.BSY line 30 when the NAND gate 40 is enabled. The gating signal for the NAND gate 40 is the PEB signal, which is set when FAS is set and either EXT.DB5 or EXT.DB4 is asserted. Thus, the EXT.SCSI.BSY signal will be transmitted to the INT.SCSI.BSY* line 30 when FAS is set and either EXT.DB5 or EXT.DB4 is asserted.

Figure 5:
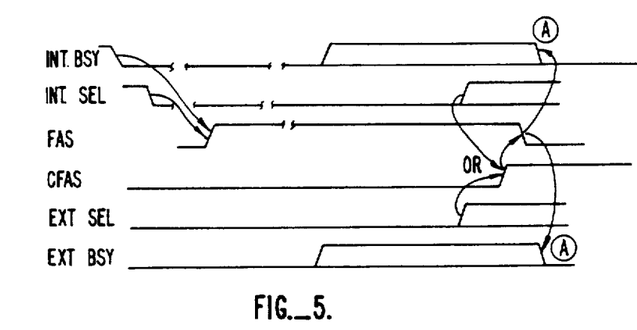
FIG. 5 is a timing diagram illustrating the control signals utilized during the ARB and SEL phases.

Referring now to FIG. 2 and 5, when neither INT.BSY or INT.SEL is asserted the buses are in the BUS.FREE phase and the FAS signal is set. Thus, the AND gate 56 is enabled and the BSY signal can be transmitted from the internal to the external side. Further, if either EXT.ID4 or 5 is asserted the AND gate 40 is enabled and the BSY signal can be transmitted from the external to the internal side. From FIG. 2, an external device asserting BSY will also assert its ID, so that the device ID signals function as the PEB signal when FAS is set.

If the BSY signal is asserted on both sided, then the inputs of EIR 39 are coupled to the outputs of the IED 38 and the input of the IED 38 is coupled to the output of the EIR 39 so that the transceiver 37 latches up. In this case, the drivers will continue to assert the BSY signal even though the devices originally asserting BSY have released the BSY line. To solve this problem, a CLEAR.FREE.ARB.STATE (CFAS) signal is set when a device on either side asserts SEL. The setting of this signal causes FAS be reset and disables either gate 40 or 56 so that the BSY signal is transmitted only from the side where the device asserting SEL resides to the other side. Thus, the latch-up conditions is terminated and the BSY lines are released at point A of the SELECTION phase.

An advantage of utilizing the external device IDs to gate the NAND gate 40 is that if the device dies, e.g., looses power, its ID signal will be reset and the latch-up condition will be terminated.

Figure 6:
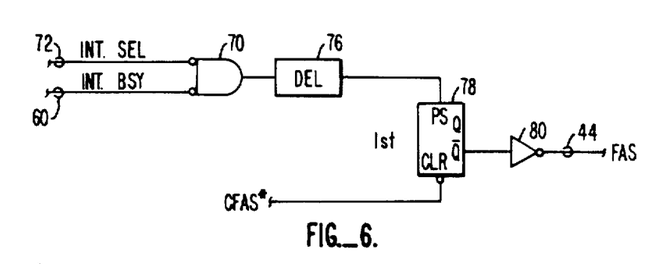
FIG. 6 is a schematic diagram depicting a system for setting and resetting the FAS control signal.

FIG. 6 is a schematic diagram of a circuit for setting and resetting the FREE.ARB.STATE (FAS) signal. A third AND gate 70 has its inverting inputs coupled to the INT.SEL signal line 72 and an INT.BSY signal line 60. The INT.SEL and INT.BSY are high true signals derived directly from the corresponding SCSI bus signals. The output of the third AND gate 70 is coupled to a delay element 76. The output of delay element 76 is coupled to the preset (PS) input of a first flip-flop (FF) 78 and the inverted output of the first FF 78 is coupled to the FAS line 48 by inverter 80. The clear (CLR) input of the first FF 78 is coupled to a clear FAS* (CFAS*) line 82 (note that in FIG. 5 the CFAS signal is shown as a high true signal for clarity).

Figure 7:
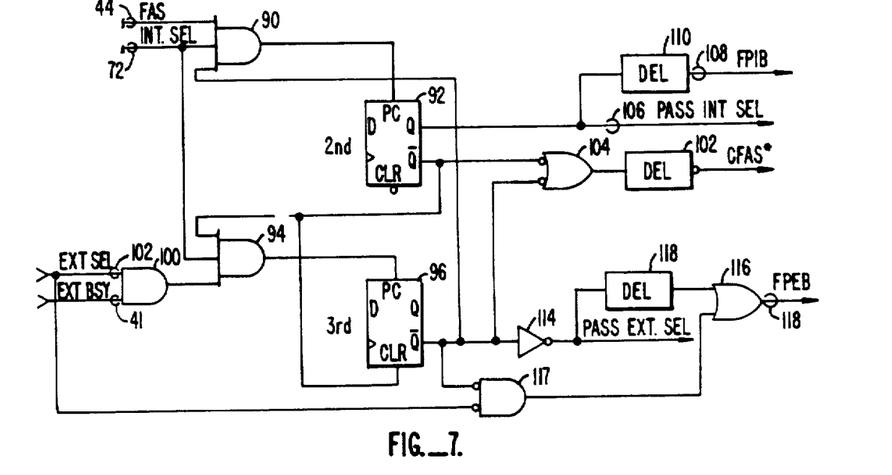
FIG. 7 is a schematic diagram depicting a system for setting and resetting the CFAS*, PASS.INT.SEL, PASS.EXT.SEL, FPIB, and FPEB control signals.

FIG. 7 is a schematic diagram of a circuit for setting and resetting the CFAS* signal. The output of a fourth AND gate 90 is coupled to the PS input of a second FF 92 and the output of fifth AND gate 94 is coupled to the PS input of a third FF 96. The inputs of the fourth AND gate 90 are coupled to the FAS line 44, the INT.-SEL line 72, and the inverted output of the third FF 96. The inputs of the fifth AND gate 94 are coupled to the FAS signal line 44, the output of a sixth AND gate 100, and the inverted output of the second FF 96. The inputs of the sixth AND gate 100 are coupled to an EXT.SEL signal line 102 and the EXT.BSY line 41. The EXT.-SEL and EXT.BSY signals are high true signals derived directly from the corresponding SCSI bus signals. The inverted output of the second FF 92 is also coupled to the CLR input of third FF 96. The false outputs of the second and third FFs 92 and 96 are coupled to delay element 102 by NAND gate 104. The inverted output of delay element 102 is the CFAS* signal.

The true output of the second FF 92 is coupled to a PASS.INT.SEL signal line 106 and to an FPIB signal line 108 via delay element 110 and the true output of the third FF 96 is coupled to a PASS.EXT.SEL signal line 112 via inverter 114 and to an OR gate 116 via inverter 114 and delay element 118. The second input of OR gate 116 is coupled to the EXT.SEL line 102 and the false output of the third FF 96 via a NOR gate 117. The output of OR gate 116 is coupled to an FPEB signal line 118. The utilization of these signals is described below.

Figure 8:
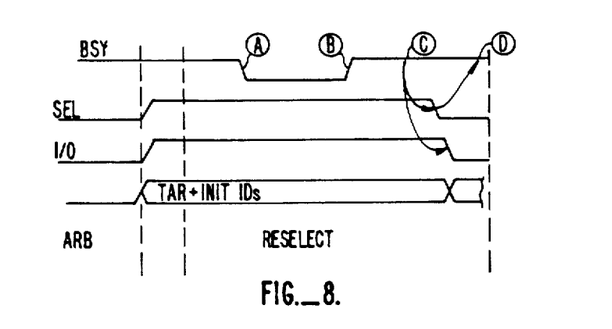
FIG. 8 is a timing diagram illustrating the SCSI RES phase.

The RESELECTION phase will now be described with reference to the timing diagram of FIG. 8. During RESELECTION a target device desires to continue an information transfer previously initiated by an initiator. Referring to FIG. 8, the ARB phase is completed and BSY has been released at point A by the reselecting target device that has won the arbitration. The target and initiator IDs are asserted on the DBUS, SEL is asserted, and I/O is asserted. The state of the I/O signal differentiates the SELECTION and RESELECTION phases. At point B the initiator detects that its ID and SEL are true and that BSY is false and asserts BSY. The target also asserts BSY at point C prior to releasing SEL. At point D the initiator releases BSY. This timing prevents the occurrence of a BUS.FREE state that could allow another device to gain control of the bus and interrupt the RESELECTION phase.

Note that at point C, the BSY signal could be transmitted in both directions thereby causing the transceiver to latch-up. However, for the configuration of FIG. 4, latch-up is avoided during the RES phase by controlling the PIB(RES) and PEB(RES) signals as depicted in the timing diagram of FIG. 9. In this example, an initiator may be coupled to only the internal side of the converter 10.

Figure 9:
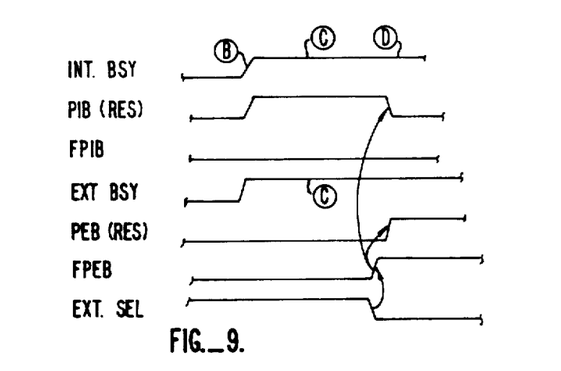
FIG. 9 is a timing diagram illustrating the control signals utilized during the RES phase.

Referring back to FIG. 4, FAS is not set during the RESELECTION phase so that the gates 40 and 56 are controlled by the PEB(RES) and PIB(RES) signals respectively. Referring now to FIG. 9, the case where the initiator is on the internal side and the target is on the external side is illustrated. At point B, the INT.BSY signal is asserted by the initiator and PIB(RES) is set so that the BSY signal is transmitted from the internal side to the external side. At point C the target also asserts BSY but the signal PEB(RES) is not set. Thus, the only the AND gate 56 is enabled and the initiator is asserting the BSY signal on the internal side.

As stated, the target is on the external side so it is imperative to give the target control of the BSY line on both the external and internal side. This is accomplished by setting a FORCE.PASS.EXT.BSY (FPEB) signal, when EXT.SEL. is reset, which causes PIB(RES) to be reset and PEB(RES) to be set. Now the NAND gate 40 is enabled and the AND gate 56 is disabled so that the target has control of the BSY line and any latch-up problems are obviated.

Since the target won the arbitration, it asserted the SEL signal to end the ARB phase and begin the RES phase. The states of the FPIB and FPEB signals are determined by which side the target device asserting SEL is located.

A system for generating these signals is depicted in FIG. 7. Referring back to FIG. 7, the second FF 92 is set when SEL is asserted by a device on the internal side and the third FF 96 is set when SEL is asserted by a device on the external side. Thus, the information regarding the side asserting SEL is stored and indicated by the state of the PASS.INT.SEL and PASS.EXT.-SEL signals, with the states of these signals necessarily being complementary.

The FPIB signal is set, after a first predetermined delay, when INT.SEL is asserted and the FPEB signal is set, after a second predetermined delay, when the EXT.SEL signal is reset.

Figure 10:
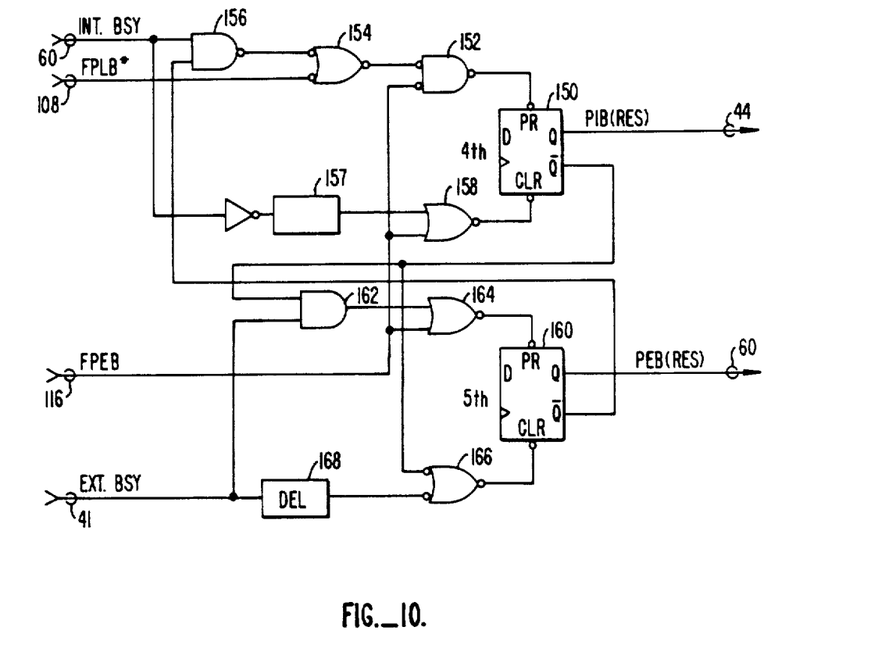
FIG. 10 is a schematic diagram depicting a system for setting and resetting the PIB(RES) and PEB(RES) control signals.

A circuit for setting and resetting the PIB(RES) and PEB(RES) signals is depicted in FIG. 10. The PIB(RES) line 44 is coupled to the true output of a fourth FF 150. The PR input of the fourth FF 150 is coupled to the INT.BSY line 60 by a NAND gate with inverted inputs 152, an NOR gate with inverting inputs 154, and a NAND gate 156, to the FPIB line 108 by gates 154 and 152, and to the FPEB* line 116 by gate 152. The CLR input of the fourth FF 150 is coupled to the INT.BSY line 60 by an invertor 156, a delay element 157, and a NOR gate 158, and to the FPEB line 116 by NOR gate 158.

The PEB(RES) line 60 is coupled to the true output of a fifth FF 160. The PR input of the fifth FF 160 is coupled to the false output of the fourth FF 160 by an AND gate 162 and a NOR gate 164, to the EXT.BSY line 41 by gates 162 and 164, and to the FPEB line 116 by gate 164. The CLR input of the fifth FF 160 is coupled to the false output of the fourth FF 150 by a NOR gate with inverting inputs 166, and to the EXT.BSY line 41 by a delay element 168 and gate 166.

The operation of the system for controlling the signals in FIG. 9 will now be described with reference to FIG. 7 and 10. During the ARB phase, the third FF 96 will be set when the target asserts EXT.BSY. Accordingly, PASS.EXT.SEL is set, however, at the beginning of the RES phase, FPEB is not set because of the delay introduced by the delay element 118. When the initiator asserts INT.BSY, at B, the fourth FF 150 is set to set PIB(RES) and transmit the BSY signal to the external side. The signal EXT.BSY is set at point C, but does not set the fifth FF 160 because the AND gate 162 is disabled by the false output of the fourth FF 150. Subsequently, the delayed PASS.EXT.SEL signal causes FPEB to be set at time C which causes the fifth FF 160 to set PEB(RES) and resets the fourth FF 150 to reset PIB(RES).

The SEL line drivers are configured as shown in FIG. 4 except that the PASS.INT.SEL and PASS.EXT.SEL signals controlled by the configuration of FIG. 7 are utilized in place of the PIB and PEB.

A single-ended/differential converter for use with the SCSI bus protocol has now been described. This system facilitates the use of the SELECTION and RESELECTION phases of the protocol when initiator devices are coupled only to the internal side of the converter. The invention has been described with reference to a preferred embodiment. However, alterations and substitutions will now be apparent to persons of ordinary skill in the art. In particular, different hardware configurations or combined hardware/software configurations could be designed to implement the control described. Accordingly, the invention is not intended to be limited except as provided by the appended claims.

What is claimed is:

1. A converter for selectively transferring signals between a single ended line of an internal bus and a differential line pair of an external bus, with both buses utilizing the SCSI bus protocol that included BUS-FREE (BF), ARBITRATION (ARB), and SELECTION phases and with both buses including BUSY (BSY), SLECT (SEL) and DATA lines for transmitting BSY, SEL, and device ID signals, respectively, where devices on both sides, internal and external, of the converter may assert BSY and their device ID signals during the ARB phase, a subsystem for facilitating the transfer of a BSY signal during the ARB phase from either side to the other and for releasing the BSY line on both sides during the SELECTION phase, said subsystem comprising:

a first driver, having an input port adapted to receive a first input signal, for asserting a differential BSY signal on the external differential BSY line pair when said first input signal is asserted;

a first receiver, comprising a gate, having first and second inputs coupled to the internal BSY line of said internal bus and a first signal line that transmits a first signal, respectively, and an output coupled to the input port of said first driver, for transferring a BSY signal from the internal BSY line to the input port of said first driver only when said first signal is set;

a second receiver, having input ports coupled to the differential BSY line pair and an output port coupled to an EXT.BSY signal line that transmits an EXT.BSY signal, for asserting said EXT.BSY signal when a BSY signal is asserted on said differential external BSY line pair;

a second driver, comprising a second gate, having first and second inputs coupled to said EXT.BSY signal line and a second signal line that transmits a second signal, respectively, and an output coupled to the internal BSY line of said internal bus, for transferring an EXT.BSY signal on said EXT.BSY signal line to the internal BSY line only if said second signal is set;

means for setting said first signal when no signals are asserted on the internal BSY and internal SEL lines, thereby indicating that the buses are in said BUSFREE phase;

means for setting said second signal only if a device coupled to the external bus asserts its device ID and said first signal is set; and means for resetting said first signal and said second signal when a device on either the internal or external side asserts the SEL signal to initiate the SELECTION phase.

2. A converter for selectively transferring signals between a single ended line of an internal bus and a differential line pair of an external bus, with both buses utilizing the SCSI bus protocol that includes BUS-FREE (BF), ARBITRATION (ARB), and SELECTION phases and with both buses including BUSY (BSY), SELECT (SEL) and DATA lines for transmitting BSY, SEL, and device ID signals, respectively, and where devices on both sides, internal and external, of the converter may assert BSY and their device ID signals during the ARB phase, a subsystem for facilitating the transfer of a BSY signal during the ARB phase from either side to the other and for releasing the BSY line on both sides during the SELECTION phase, said subsystem comprising:

means, adapted to receive a first PASS signal, for transferring a BSY signal assert on the internal BSY line to the external differential BSY line pair only when said first PASS signal is set;

means, adapted to receive a second PASS signal, for transferring a BSY signal asserted on the external differential BSY line pair to the internal BSY line only when said second PASS signal is set;

means for setting said first PASS signal only when no signals are asserted on the internal BSY and SEL lines to indicate that the buses are in the BF phase;

means for setting said second PASS signal only when said first PASS signal is set and a device on the external side is asserting BSY; and means for resetting said first and second PASS signals in response to a device on either the internal or external side asserting the SEL signal to initiate the SELECTION phase.

3. A converter for selectively transferring signals between a single ended line of an internal bus and a differential line pair of an external bus, with both buses utilizing the SCSI bus protocol that includes BUS-FREE (BF), ARBITRATION (ARB), and SELECTION or RESELECTION phases and with both buses including BUSY (BSY), SELECT (SEL) and DATA lines for transmitting BSY, SEL, and device ID signals, respectively, where initiator and target devices may be coupled to the internal bus and target devices may be coupled to the external bus and where devices on both sides, internal and external, of the converter may assert BSY and their device ID signals during the ARB phase, a subsystem for facilitating the transfer of a BSY signal during the RESELECTION phase, said subsystem comprising:

means, adapted to receive a first PASS signal, for transferring a BSY signal asserted on the internal BSY line to the external differential BSY line pair only when said first PASS signal is set;

means, adapted to receive a second PASS signal, for transferring a BSY signal asserted on the external differential BSY line pair to the internal BSY line only when said second PASS signal is set;

means for storing an indication of whether a target device asserting the SEL signal during the ARB phase was located on the internal side or the external side;

means for setting said first PASS signal, during the RES phase, when an initiator device asserts the BSY signal; and means, responsive to said indication, for resetting said first PASS signal, set during the RES phase, and setting said second PASS signal when a target device asserts BSY only if a target device on said external side asserted SEL during the ARB phase.

4. A converter for selectively transferring signals between a single ended line of an internal bus and a differential line pair of an external bus, with both buses utilizing the SCSI bus protocol that includes BUS-FREE (BF), ARBITRATION (ARB), and SELECTION phases and with both buses including BUSY (BSY), SLECT (SEL) and DATA lines for transmitting BSY, SEL, and device ID signals, respectively, where devices on both sides, internal and external, of the converter may assert BSY and their device ID signals during the ARB phase, a subsystem for facilitating the transfer of a BSY signal during the ARB phase from either side to the other and for releasing the BSY line on both sides during the SELECTION phase, said subsystem comprising:

an external receiver circuit that converts a differential external BSY signal into a single ended BSY signal;

an external gate circuit that receives the single ended BSY signal and transfers the single ended BSY signal to the single ended internal BSY line only when an external gate signal is set;

an internal driver circuit, having an enable port coupled to an enable line for receiving a signal asserted on said enable line, that asserts a differential external BSY signal only when said signal is asserted on said enable line;

an internal gate that receives the single ended internal BSY signal and transfers the single ended internal BSY signal to said enable line only when an internal gate signal is set;

an internal logic circuit, with inputs for receiving internal SEL and BSY signal and the external SEL and BSY signals, that sets the internal gate signal during the BF state only when both the internal BSY and SEL signals are not asserted and resets the internal gate signal when either the internal or external SEL signal is asserted during the SELECTION phase;

an external logic circuit, having inputs for receiving said internal gate signals and external device ID signals, that sets the external gate signal only when the internal gate signal is set and an external device ID signal is asserted and resets said external gate signal only when said internal gate or device ID signals are reset or released.

5. A converter for selectively transferring signals between a single ended line of an internal bus and a differential line pair of an external bus, with both buses utilizing the SCSI bus protocol that included BUS-FREE (BF), ARBITRATION (ARB), and RESELECTION phases and with both buses including BUSY (BSY), SLECT (SEL) and DATA lines for transmitting BSY, SEL, and device ID signals, respectively, where initiator and target devices may be coupled to the internal bus and target devices may be coupled to the external bus and where devices on both sides, internal and external, of the converter may assert BSY and their device ID signals during the ARB phase, a subsystem for facilitating the transfer of a BSY signal during the ARB phase from either side to the other and for releasing the BSY line on both sides during the RESELECTION phase, said subsystem comprising:

an external receiver circuit that converts a differential external BSY signal into a single ended BSY signal;

an external gate circuit that receives the single ended BSY signal and transfers the single ended BSY signal to the single ended internal BSY line only when an external gate signal is set;

an internal driver circuit, having an enable port coupled to an enable line for receiving a signal asserted on said enable line, that asserts a differential external BSY signal only when said signal is asserted on said enable line;

an internal gate that receives the single ended internal BSY signal and transfers the single ended internal BSY signal to said enable line only when an internal gate signal is set;

a logic circuit which sets said internal gate signal and resets said external gate signal when an initiator asserts the internal BSY signal and resets said internal gate signal and sets said external gate signal a fixed time interval after said initiator asserted the internal BSY signal only if a target device on the external side asserted SEL during the ARB phase.

* * * * *